United States Patent [19]
Stevko

[11] 3,762,237
[45] Oct. 2, 1973

[54] DIGITALLY CONTROLLED LINEAR ACTUATOR
[75] Inventor: Phillip J. Stevko, Euclid, Ohio
[73] Assignee: Bailey Meter Company, Wickliffe, Ohio
[22] Filed: Jan. 3, 1972
[21] Appl. No.: 214,620

[52] U.S. Cl. .................................... 74/479, 287/3
[51] Int. Cl. ............................................ G05g 11/00
[58] Field of Search .................... 74/479; 287/3, 87, 287/12

[56] References Cited
UNITED STATES PATENTS
3,407,018  10/1968  Miller .............................. 74/101 X
FOREIGN PATENTS OR APPLICATIONS
682,998  11/1952  Great Britain ........................ 74/479
835,049  5/1960  Great Britain ........................ 74/479

*Primary Examiner*—Milton Kaufman
*Attorney*—Joseph L. Brzuszek

[57] ABSTRACT

A device having a triangular shaped main body mounting an output member and with locking position acting inputs mounted proximate to each corner is made to function as a D/A converter. Two discreet positions for each input contributes to the extension of the output member and allows it to assume eight distinct positions, each depending on the combination of input positions. Another arrangement with nine position inputs mounted proximate to the corners of three triangles allows the output member to assume 512 distinct positions depending upon the combination of input positions. The inputs are arranged to provide unequal additive contributions to the output member's motion. Equal stroke amplitude inputs require the distances at which the inputs appear from the output member to be unequal to provide unequal contributions to the output member. Unequal stroke amplitudes require the inputs to appear at equal distances with respect to the output member. The load on the output member is distributed among the actuators in the ratio of the distance each input appears from the output member to the sum of the three input distances to the output member.

9 Claims, 6 Drawing Figures

PATENTED OCT 2 1973 3,762,237

DIGITALLY CONTROLLED LINEAR ACTUATOR

BACKGROUND OF THE INVENTION

1. Field of the Invention

This invention relates to digitally actuated control elements in general, and more particularly to digital input devices which provide a linear output suitable for interfacing with analog output equipment.

2. Description of the Prior Art

In past situations where a digital input, such as from a digital computer control interface was used to control a process, a D/A (digital to analog) converter and an analog controller were used between the computer's control interface and the final control element. The D/A converter and analog controller combination resulted in time delay and error between the digital control signal generated by the computer and the positioning of the final control element. The analog controller further required a position feedback signal from the final control element to assure outputs of proper repeatability and accuracy.

Unless the analog controller utilized derivative and integral control modes along with the proportional mode, the final control was susceptible to offset errors, instability of operation, overshoot of the setpoint, and oscillations about the control point. These problems are always present in analog controllers. Even when all three control modes are utilized, these modes require proper balancing to avoid the above-mentioned problems. This balancing is a delicate operation and therefore time consuming.

Digital control valves are presently available which accept a plurality of digital inputs to incrementally control the output of the valve. This type of valve is presently available from one manufacturer and comprises an in-line inlet manifold coupled to an outlet manifold by individual ON-OFF control orifices. Each orifice is individually controlled by a bit from a digital computer output and the outputs of these individual orifices are additive. This valve is limited, however, to digitally controlling the flow of a fluid. To obtain linear output motion from this device some flow to motion or pressure to motion device is required. Furthermore, the force on the individual orifice is determined by the pressure head in the device and full line pressure appears on each orifice. The load is not distributed among the orifices.

Digital input linear motion devices are known wherein a two solenoid actuator input provides four linear output positions. This type of device is disclosed in my U.S. Pat. No. 3,064,470 entitled Engine Test Apparatus. However, the incremental output is produced by a series of pivoted levers and is not of sufficient resolution to make it suitable for analog control purposes.

SUMMARY OF THE INVENTION

In accordance with the present invention there is provided a device for converting digital input signals to linear motion of an output member. A main structure forms a triangle and has a plurality of actuators mounted near the ends of this triangle which exhibit locking mechanical motion. Coupling means connect and restrain the mechanical motion of the actuators to the main structure transmitting their motion to the output member of the main structure thereby.

Further in accordance with this invention, the actuators are superseded secondary triangular structures mounted near the ends of the main structure. The contributions of each of the three secondary triangular structures are inputed to the corners of the main triangular structure and to the output member of the main triangular structure. The secondary structures are scaled so as to have the three secondary triangular structures provide a coarse, medium, and fine adjustment respectively.

Further in accordance with the invention, the lever arms between the inputs of each triangular structure and its respective output member are of either identical or differing length. When the lever arms are of identical length, the load on the output member is equally distributed among the inputs. When the lever arms are not identical the load on the output member will be distributed in the ratio of the lever arm lengths to the total lengths of the lever arms. The motion of the inputs is transmitted to the output member through the respective lever arms of the triangular structure. Actuator motion and load distribution is calculated from a ratio equation relating these lever arms. When the main triangular structure has three digital actuators each located at one end of the triangle and having strokes proportional in the ratio of 1:2:4, eight distinct positions of the output member are produced. This produces a resolution suitable for controlling analog processes.

This invention obviates the need for a D/A converter and the analog controller in process control systems by providing a device that accepts parallel or series-parallel digital inputs from the control interface of a digital computer and converts these inputs into linear motion of an output member which has a resolution of approximately 0.2 percent. This high resolution of the output member provides an effective analog output suitable for controlling process analog final control elements.

The actuators can be shifted at high speeds with no problems of overshoot or instability. This obviates the need for a PID analog controller and, consequently, allows faster response times to computer commands than a system requiring D/A conversion along with an analog controller. The fast reaction of the control system using the invention fully utilizes the inherent high-speed calculating ability of the computer.

The Applicant's device is such that the individual actuators proportionally support the load the output member is subjected to. Thus the load is equally distributed among the actuators.

The Applicant's device, by converting digital inputs to a high resolution linear motion, is not limited to controlling flow, but may be used for other analog functions such as indicating and recording.

The principal object of the invention, therefore, is to provide a digital input activated linear output device suitable for controlling analog functions.

Another object of the invention is to provide a device wherein the load on the output member may be proportionally distributed among the input devices.

Another object of the invention is to provide an incremental linear output device wherein the resolution is determined by the number of digital inputs.

DESCRIPTION OF THE PREFERRED EMBODIMENTS

Figure 1:
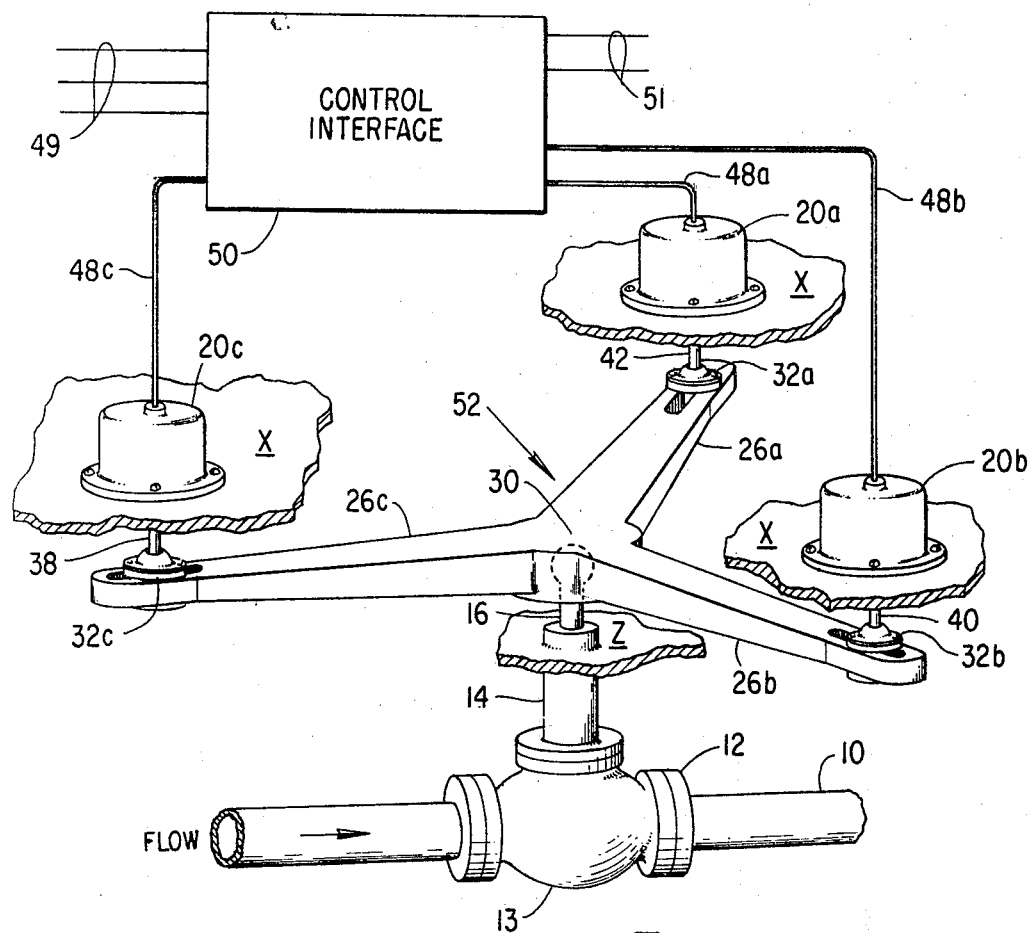
FIG. 1 depicts an eight-position linear actuator controlled by three digital input signals.

Referring now to the drawings wherein the showings are for the purposes of setting forth the preferred embodiments of the invention and not for the purpose of limiting same, FIG. 1 shows a main spider assembly 52 having a spider hub 30, a first arm 26a, a second arm 26b, and a third arm 26c. An output member 16 pivotally connects the spider assembly 52 and extends from the spider hub 30 through a rigid mounted sleeve bearing 14 into a control coupler 12 which is either in fixed spaced relationship or integral therewith and which allows the member 16 to control a pipe line 10 by restricting a final control element 13 proportionally to the stroke of the output member 16. This control element may be either a damper or valve or any other element which can utilize desired analog positioning to regulate a process variable. At the end of the first arm 26a there is a first coupler 32a which is a universal joint accommodating a first actuating rod 42 having two set positions controlled by a first actuator 20a. Similarly at the end of the second arm 26b there is a second coupler 32b accommodating a second actuating rod 40 having two set positions controlled by a second actuator 20b. And likewise at the end of the third arm 26c there is a third coupler 32c accommodating a third actuating rod 38 having two set positions controlled by a third actuator 20c.

Figure 1A:
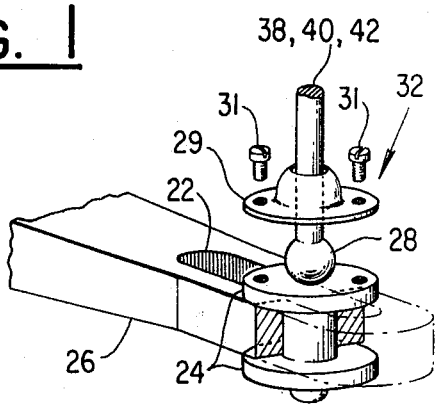
FIG. 1a depicts a blow-up of the sliding couple between the actuator and the triangular structure.

Referring generically to FIG. 1a, the couplers 32 are joined to slots 22 in the lever arms 26 and are free to slide within these slots to prevent binding of the mechanism as the main assembly 52 tilts under the action of the actuators 20. The couplers 32 are each comprised of a main slide member 24 into which a ball 28 on the end of each actuator rod 38, 40, 42 fits to allow pivoting of the assembly 52. The ball is retained in the member 24 by a retaining plate 29 fastened to the member 24 by screws 31. The actuators 20a, 20b, 20c are digitally acting in that they accept digital ("on-off") input signals from a control interface 50, which is either electrical or fluidic, through corresponding digital input lines 48a, 48b, 48c, respectively, and lock in either the extended or retracted rod state. The actuators 20a, 20b, 20c, are all mounted on a common rigid surface X shown only in sections around the actuator bodies. The sleeve bearing 14 is mounted in rigid surface Z which has structural integrity with surface X and is also adapted to form a housing for the assembly 52. The respective actuating rods 42, 40, 38 are free to move in and out of the actuator bodies through surface X in response to a signal from the control interface 50 thus controlling the coupling member 16 and the final control element 13. The control interface 50 is connected by input lines 49 to a general process digital computer (not shown) of a type familiar to those skilled in the art.

The control interface 50 is energized through supply power lines 51 connected to a suitable power supply (not shown) which may be electrical or fluidic.

In actual operation the actuating rods of each of the actuators 20a, 20b, 20c, are locked in one of two possible positions, with the actual position determined by the signal received from the control interface 50. Each actuator 20 contributes a different increment of motion to the coupling member 16. All the individual actuator outputs are additive in the relative vertical position of the coupling member 16 with respect to the control coupler 12. Thus eight distinct positions of the coupling member 16 are obtainable depending on the respective conditions of the actuators. The following table illustrates these possible positions, in relative units, as related to different actuators 20 being energized when the effect of each actuator on the coupling member 16 is in the ratio one, two, and four units respectively.

| Actuators Energized | Motion of Coupling Member (units) |
|---|---|
| None | 0 |
| 20a | 1 |
| 20b | 2 |
| 20a, 20b | 3 |
| 20c | 4 |
| 20a, 20c | 5 |
| 20b, 20c | 6 |
| 20a, 20b, 20c | 7 |

Figure 2:
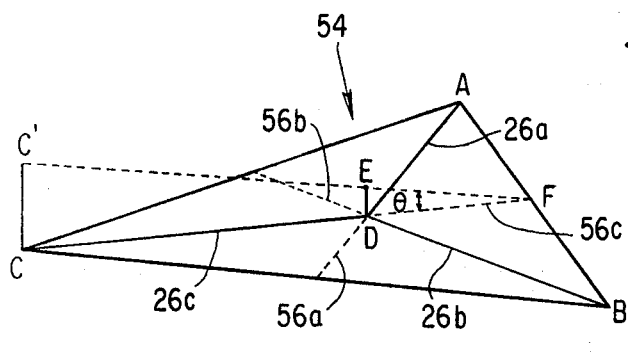
FIG. 2 depicts a schematic of the triangle formed by the main structure and the motion ratio of the output member to one of the actuators.
Figure 2A:
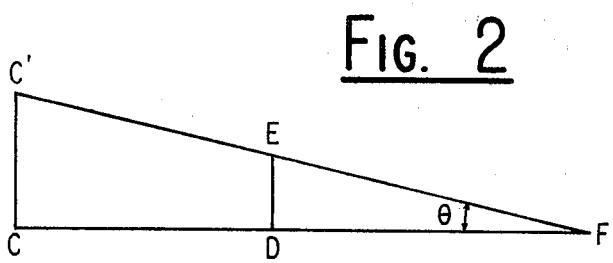
FIG. 2a depicts an expanded view of the actuator motion and respective output member motion.

To better understand the actual relationship between the actuator motion and the motion of the coupling member let us now refer to FIGS. 2 and 2a. Drawing lines to connect the adjacent ends of the arms 26 of the main spider assembly 52, we produce a formed triangle 54 having ends A, B, C. Actuating any one of the actuators 20, as for example actuator 20c located at point C to have it move up to point $C'$, allows the main spider assembly 52 to pivot about the line AB connecting the remaining two actuators 20a, 20b at points A and B traversing an angle $\theta$. The rotation at points A and B is possible because of the universal joint couplers 32a, 32b connecting the actuators 20a, 20b to the main assembly 52. Binding of the actuator and main assembly 52 is prevented by the slots in lever arms 26 as described in reference to FIG. 1a. If we extend the lever arm 26c by drawing an imaginary line 56c to a point F on the line connecting points A, B, a right triangle formed by connecting points $C, C', F$ includes the two positions $C, C'$, of the actuator 20c and the corresponding positions D, E, of the coupling member 16. The corresponding motion of the coupling member can now be approximated using a well known trigonometric function.

$$\sin \theta = \text{side opposite angle } \theta/\text{hypotenuse}$$

$$\sin \theta = CC'/C'F = DE/EF$$

or: $CC'/DE = C'F/EF = (C'E + EF)/EF = (C'E/EF) + 1$ or: $CC'/DE = (C'E/EF) + 1$

Where:

$CC'$ = length of the line from point $C$ to point $C'$ (actuator 20c amplitude)

$DE$ = length of the line from point $D$ to point $E$ (corresponding output member 16 motion)

$C'F$ = length of the line from point $C'$ to point $F$ (spider arm length 26c + lever extension 56c in elevated position)

$EF$ = length of the line from point $E$ to point $F$ (lever extension 56c in elevated position)

$C'E$ = length of the line from point $C'$ to point $E$ (spider arm 26c in elevated position)

Assuming the spider arm 26c and lever extension 56c will change length negligibly in the elevated position, we see that the portion of the actuator 20c motion transmitted to the coupling member 16 will depend upon the length of the spider arm 26c and the length of the corresponding lever extension 56c. If all the spider arms 26 are of an equal length, the formed triangle 54 is equilateral and the lever extensions 56 are approximately one-half the length of the spider arms. This allows approximately one third of the actuator 20 motion to be transmitted to the coupling member 16. To provide that the transmitted motion from each actuator be different, each actuator has a stroke of a different amplitude in the ratios of 1:2:4 respectively. The load on the coupling member 16 will be equally distributed among the three actuators 20a, 20b, 20c, because of the equal length spider arms 26.

Actuators 20 having identical amplitude strokes could also be used to provide different coupling member 16 motion by changing the spider arms 26 to be of non-identical length thus allowing them to transmit non-identical portions of the identical actuator 20 motion to the coupling member 16. The load on the coupling member will not be distributed equally among the actuators 20 but in the ratio of the respective lengths of the lever arms 26a, 26b, 26c, to the sum of the individual lengths of the lever arms.

Figure 3:
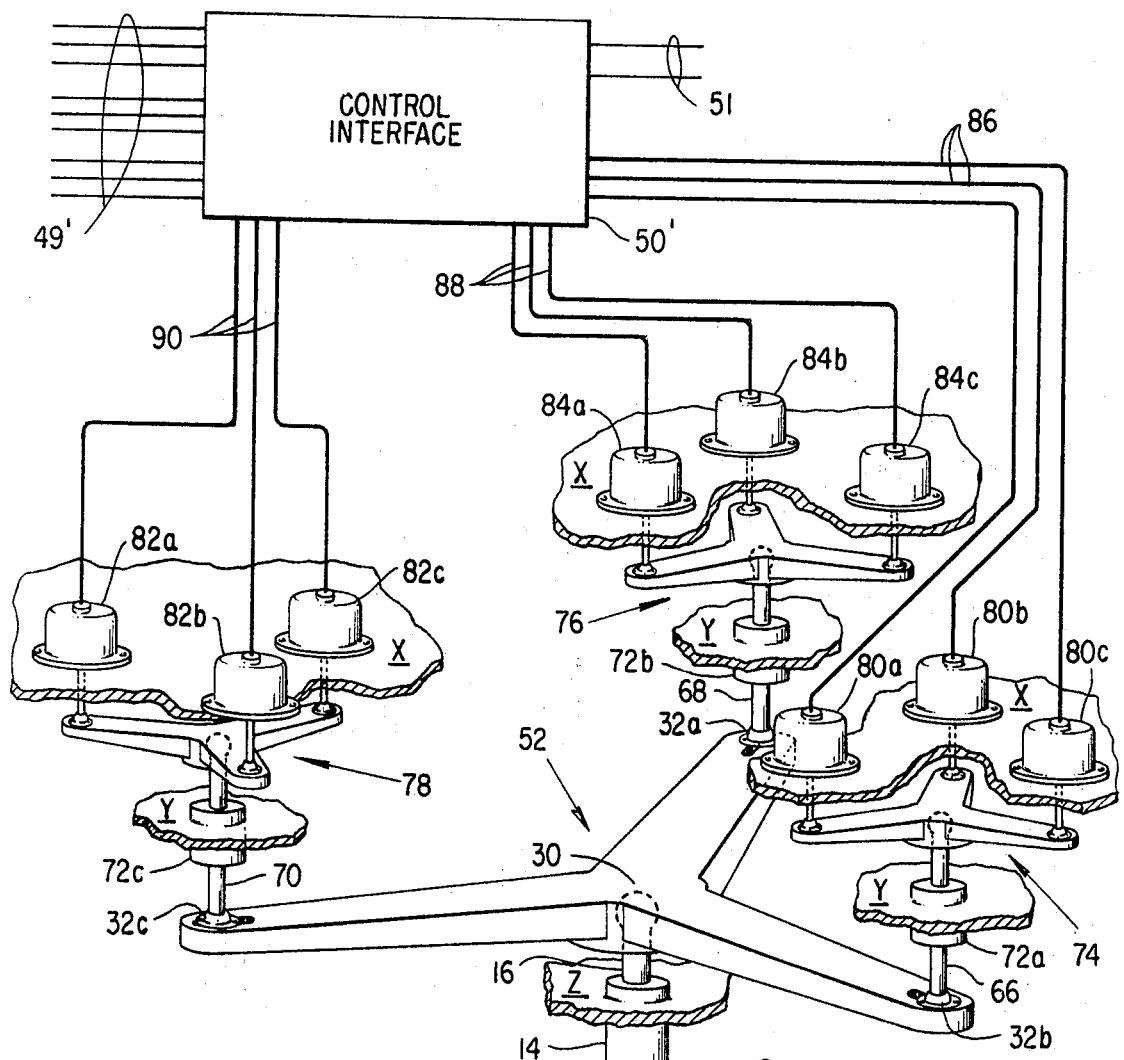
FIG. 3 depicts a 512 position linear actuator controlled by nine digital input signals.

Referring now to FIG. 3, the main spider assembly 52 has a first spider sub-assembly 76 with a first output member 68 coupled to the first coupler 32a. A second spider sub-assembly 74 is coupled to the second coupler 32b through a second output member 66. A third spider sub-assembly 78 is coupled to the third coupler 32c through a third output member 70. All three output members 66, 68, 70 are pivotally connected to the sub-assemblies 76, 74, 78 and are restricted to vertical motion through rigidly mounted member bearings 72a, 72b, 72c, respectively held in surface plane Y. Three first sub-assembly actuators 84a, b, c are connected to the control interface 50' through first sub-assembly actuator input lines 88. Three second sub-assembly actuators 80a, b, c are also connected to the control interface 50' through second sub-assembly actuator input lines 86. Three third sub-assembly actuators 82a, b, c are connected to the control interface 50' through third sub-assembly actuator input lines 90. Each spider sub-assembly 74, 76, 78, is a scaled version of the main spider assembly 52 in general construction. The first, second and third sub-assembly actuators 84, 80, 82 are all rigidly mounted to a plane X shown in part around the actuators.

In operation, each spider sub-assembly 74, 76, 78, operates in the same fashion as the main spider assembly, described in reference to FIGS. 1 and 2, by providing eight distinct positions to its respective output member 66, 68, 70, through the interaction of the respective sub-assembly actuators 80, 84, 82. Whereas the embodiment described in reference to FIG. 1 provided eight possible positions to the coupling member 16, the present embodiment provides 512 possible positions to the coupling member 16. This increased number of positions is possible since a total of nine actuators having two distinct positions are used. Thus the possible combinations of the actuator positions becomes $2^9$ or 512 as compared to the three two position actuators of the FIG. 1 embodiment providing $2^3$ combinations or eight positions. A similar expansion of the number of actuator positions, and hence resolution of control, is possible by the proper choice of multi-position actuators coupled to the main assembly 52.

The actuation of the first sub-assembly actuators 84a, 84b, 84c will provide eight coarse adjustment vertical positions to the coupling member 16. The actuators 80a, 80b, 80c of the second sub-assembly are scaled in their stroke amplitude to provide one-eighth of the movement to the output member of that provided by the first sub-assembly actuators 84. Thus the second spider sub-assembly 74 provides medium adjustment positions to the coupling member 16 between the eight coarse positions of the coupling member 16 provided by the first spider sub-assembly 76. Similarly the actuators 82a, 82b, 82c, are scaled in their stroke amplitude to provide one eighth of the coupling member 16 movement provided by the second sub-assembly actuators 80. Thus the third spider sub-assembly 78 provides fine adjustment positions between the second spider sub-assembly medium adjustment positions.

Figure 4:
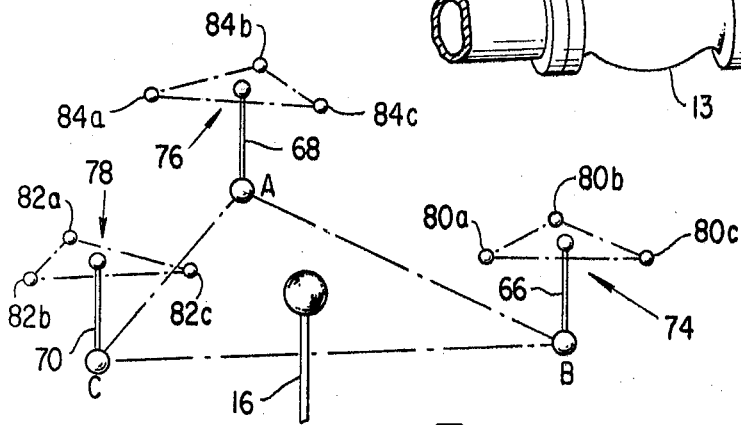
FIG. 4 depicts a schematic of triangles formed by a main spider assembly and three spider sub-assemblies showing the relationship of the actuator to the output member.

Referring now to FIG. 4 the actuators 84, 80, 82, are located on the tips of triangles formed by the first, second and third spider sub-assemblies 76, 74, 78. These sub-assemblies couple to the tips of the triangle formed by the main spider assembly 52. Since all the formed triangles are equilateral with output occurring in the center of the respective triangle, the motion of any tip results in a motion of one-third that distance at the respective triangle's center. Thus when actuator 82a moves through its amplitude, one-third of that motion appears at tip C of the main formed triangle ABC. In turn one-third of the motion of point C appears at the output member 16 or 1/9 of the actuator's 82a motion. The motion of the actuators are set so that each succeeding actuator has one-half the motion of its predecessor. The amplitude of stroke required for each actuator may be calculated from the desired stroke of the coupling member 16. Assuming we want a coupling member 16 stroke of 1 inch then:

$$1_{in} = 1/3 \times 1/3\ (S + S/2 + S/4 + \cdots - S/256\ )$$

where $S$ is the stroke of the greatest amplitude actuator. Solving the above equation yields of value of 4.509 inches for $S$. The remaining actuators are then one-half the stroke distance of the previous one.

Since all the lever arms are equal, the load on the coupling member 16 is equally distributed among the nine actuators. As previously described in reference to FIGS. 1 and 2 the strokes of all the actuators could be made equal if the respective lever arms were set up to a desired ratio of motion transmitted to the coupling member. The load on the coupling members would then be distributed in the ratio of the different lever arms rather than equally.

Certain modifications and improvements will become obvious to persons skilled in the art upon reading this specification. It is intended that these obvious modifications and improvements be also included in the scope of this application.

What I claim as new and desire to secure by Letters Patent of the United States is:

1. A device for converting a plurality of digital input signals into linear motion of an output member, comprising:

a triangular structure pivotally connected to said output member at some point within said structure having slots formed in the extremities thereof;

a plurality of actuators with each said actuator mounted near one of the three extremities of said triangular structure and each exhibiting and locking mechanical motion in response to a digital input signal; and a plurality of ball joints received in said triangular structure slots, each connecting and restraining the mechanical motion of said respective actuators in a singular degree of motion to said triangular structure, for transmitting said actuator motion to said triangular structure and to said output member thereby.

2. A device as set forth in claim 1 wherein said triangular structure includes a spider assembly having a hub and three radial members, said output member being pivotally mounted in said hub and said actuators being individually mounted near the ends of the three radial members with the mechanical leverage of said actuators having couples proportioned in predetermined ratios.

3. A device for converting a plurality of digital input signals into linear motion of an output member comprising:

a first digitally acting linear actuator responsive to said input signals;

a second digitally acting, linear actuator, having an amplitude different from said first actuator, responsive to said input signals;

a third digitally acting linear actuator, having an amplitude different from both said first and said second actuator, responsive to said input signals; and, ball joint and seat means, coupled to said first, second, and third actuator, for additively combining the motion of said first, second, and third actuators to produce a linear motion of said output member.

4. A device as set forth in claim 3 wherein said combining means includes:

a triangular structure having said slots formed in the extremities thereof for receiving said first, second, and third actuator ball joints near the respective ends of said triangular structure, wherein said output member is pivotally coupled within said triangular structure to move in response to the motion of said first, second, and third actuators; and means for restraining the motion of said coupling member to positions with a singular degree of motion.

5. A device as set forth in claim 4 wherein said triangular structure forms an equilateral triangle with said output member mounted equidistant from said first, second, and third actuators to allow one-third of the motion of said actuators to be additively exhibited by said output member and an equal distribution of the load on said output member among said first, second, and third actuators.

6. A device for converting a plurality of digital input signals into linear motion of an output member comprising:

a main triangular structure pivotally connected to said output member and having slots formed in the extremities of said main triangular structure;

a first triangular structure having a ball joint connected to said slot in one corner of said main triangular structure;

a second triangular structure having a ball joint connected to said slot in a second corner of said main triangular structure;

a third triangular structure having a ball joint connected to said slot in a third corner of said main triangular structure;

a plurality of linear digital actuators connected to the corners of said first, second, and third triangular structures for actuating said main triangular structure and the output member thereby.

7. A device as set forth in claim 6 wherein each set of digital actuators of said plurality associated with one of said numbered triangular structures exhibits digital motion of scaled amplitudes one-eighth and one-sixty fourth that of the preceding two respective sets of digital actuators associated with the other said numbered triangular structures so as to provide coarse, medium and fine positioning adjustments to said output member.

8. A device as set forth in claim 6 wherein each digital actuator of said plurality of actuators exhibits digital motion of different amplitude in the ratios of 1:2:4 respectively for each of the first, second and third triangular structures.

9. A device as set forth in claim 8 wherein said first, second, and third triangular structures include spiders having equally spaced extensions of equal length radiating from their respective center hubs.

* * * * *